United States Patent
Müller et al.

(10) Patent No.: US 8,501,868 B2
(45) Date of Patent: Aug. 6, 2013

(54) THERMOPLASTIC MOLDING COMPOSITIONS WITH IMPROVED OPTICAL PROPERTIES

(75) Inventors: Matthias Müller, Pfungstadt (DE); Ludger Leber, Dannstadt-Schauernheim (DE); Achim Datko, Leimen (DE); Leonie Felicitas Braun, Mannheim (DE); Christian Lemaire, Ludwigshafen (DE); Piyada Charoensirisomboon, Mannheim (DE); Michel Pepers, Ludwigshafen (DE)

(73) Assignee: Styrolution GmbH, Frankfurt (DE)

( * ) Notice: Subject to any disclaimer, the term of this patent is extended or adjusted under 35 U.S.C. 154(b) by 0 days.

(21) Appl. No.: 13/072,099

(22) Filed: Mar. 25, 2011

(65) Prior Publication Data

US 2011/0237749 A1  Sep. 29, 2011

Related U.S. Application Data

(60) Provisional application No. 61/317,707, filed on Mar. 26, 2010.

(51) Int. Cl.
- *C08L 33/12* (2006.01)
- *C08L 51/06* (2006.01)
- *C08L 25/12* (2006.01)
- *C08L 33/20* (2006.01)
- *C08L 51/04* (2006.01)

(52) U.S. Cl.
USPC .............................................. 525/83; 525/84

(58) Field of Classification Search
USPC ................................................... 525/83, 84
See application file for complete search history.

(56) References Cited

U.S. PATENT DOCUMENTS

| | | | |
|---|---|---|---|
| 4,762,886 A * | 8/1988 | Hirai et al. | 525/70 |
| 4,990,565 A * | 2/1991 | Blasius, Jr. | 525/71 |
| 6,087,449 A | 7/2000 | Tiefensee et al. | |
| 6,187,825 B1 | 2/2001 | Guntherberg et al. | |
| 6,498,232 B1 | 12/2002 | Guntherberg et al. | |
| 2003/0105225 A1 | 6/2003 | Breulmann et al. | |
| 2003/0181583 A1 | 9/2003 | Duijzings et al. | |
| 2006/0111515 A1 * | 5/2006 | Simmons et al. | 525/191 |
| 2007/0167573 A1 | 7/2007 | Stork et al. | |
| 2008/0207830 A1 | 8/2008 | Weber et al. | |
| 2009/0043047 A1 * | 2/2009 | Ha et al. | 525/77 |
| 2010/0210804 A1 | 8/2010 | Guntherberg et al. | |

FOREIGN PATENT DOCUMENTS

| | | |
|---|---|---|
| CA | 1056975 A1 | 6/1979 |
| DE | 2427960 B1 | 6/1975 |
| EP | 1548061 A1 | 6/2005 |
| GB | 1472195 A | 5/1977 |
| WO | WO-97/08241 A1 | 3/1997 |
| WO | WO-98/28344 A1 | 7/1998 |
| WO | WO-00/32376 A1 | 6/2000 |
| WO | WO-01/83574 A1 | 11/2001 |
| WO | WO-02/10222 A1 | 2/2002 |
| WO | WO-2005/059029 A1 | 6/2005 |
| WO | WO-2005/075560 A1 | 8/2005 |
| WO | WO-2006/087279 A1 | 8/2006 |
| WO | WO-2007/036495 A1 | 4/2007 |

* cited by examiner

Primary Examiner — Jeffrey Mullis
(74) Attorney, Agent, or Firm — Novak Druce Connolly Bove + Quigg LLP

(57) ABSTRACT

The present invention relates to thermoplastic molding compositions having a mixture of (a) from 10 to 50% by weight of a methyl methacrylate polymer as component (A), from 20 to 60% by weight of a copolymer as component (B), and from 20 to 70% by weight of a graft copolymer as component (C). Component (C) is obtainable from components (c1) a core, (c2) a first graft shell, and (c3) a second graft shell. The second graft shell (c3) is obtainable via polymerization of a $C_1$-$C_8$-alkyl ester of methacrylic acid as component (c31) and a further vinylaromatic monomer as component (c32). Graft copolymer (C) is produced via emulsion polymerization and is isolated from the reaction mixture by precipitation resulting from shear. Also disclosed are processes for producing the molding compositions, the use of the molding compositions, and moldings obtainable from the molding compositions.

10 Claims, No Drawings

THERMOPLASTIC MOLDING COMPOSITIONS WITH IMPROVED OPTICAL PROPERTIES

CROSS-REFERENCE TO RELATED APPLICATIONS

This Application claims the benefit of U.S. Provisional Application 61/317,707 filed on Mar. 26, 2010 which is incorporated by reference.

BACKGROUND OF THE INVENTION

The present invention relates to thermoplastic molding compositions comprising a mixture of
(a) from 10 to 50% by weight, based on the entirety of components (A), (B), and (C), of a methyl methacrylate polymer as component (A), obtainable via polymerization of a mixture composed of
  (a1) from 90 to 100% by weight, based on (A), methyl methacrylate as component (A1), and
  (a2) from 0 to 10% by weight, based on (A), of a $C_1$-$C_8$-alkyl ester of acrylic acid as component (A2), and
(b) from 20 to 60% by weight, based on the entirety of components (A), (B), and (C), of a copolymer as component (B), obtainable via polymerization of a mixture composed of
  (b1) from 70 to 90% by weight, based on (B), of a vinylaromatic monomer as component (B1), and
  (b2) from 10 to 30% by weight, based on (B) of a vinyl cyanide as component (B2), and
(c) from 20 to 70% by weight, based on the entirety of components (A), (B), and (C), of a graft copolymer as component (C), obtainable from
  (c1) from 50 to 70% by weight, based on (C), of a core as component (C1), obtainable via polymerization of a monomer mixture composed of
    (c11) from 65 to 89.9% by weight, based on (C1) of a 1,3-diene as component (C11), and
    (c12) from 10 to 34.9% by weight, based on (C1), of a vinylaromatic monomer as component (C12), and
    (c13) from 0.1 to 5% by weight, based on (C1), of an agglomeration polymer as component (C13), and
  (c2) from 15 to 25% by weight, based on (C), of a first graft shell as component (C2), obtainable via polymerization of a monomer mixture composed of
    (c21) from 30 to 49.9% by weight, based on (C2), of a vinylaromatic monomer as component (C21), and
    (c22) from 50 to 69.9% by weight, based on (C2), of a $C_1$-$C_8$-alkyl ester of methacrylic acid and/or of a $C_1$-$C_8$-alkyl ester of acrylic acid as component (C22), and
    (c23) from 0.1 to 3% by weight, based on (C2), of a crosslinking monomer as component (C23), and
  (c3) from 15 to 25% by weight, based on (C), of a second graft shell as component (C3), obtainable via polymerization of a monomer mixture composed of
    (c31) from 20 to 80% by weight, based on (C3), of a $C_1$-$C_8$-alkyl ester of methacrylic acid as component (C31) and
    (c32) from 20 to 80% by weight, based on (C3), of a further monomer as component (C32), and
(d) optionally, amounts of up to 20% by weight, based on the entirety of components (A), (B), and (C), of conventional additives as component (D).

The present invention further relates to processes for producing the thermoplastic molding compositions of the invention, and to the use of these, and to the moldings that can be obtained therefrom.

WO 97/08241 discloses molding compositions which are composed of a hard methyl methacrylate polymer, of a hard vinylaromatic-vinyl cyanide polymer, and of a soft graft copolymer comprising an elastomeric graft core, a first graft shell made of a vinylaromatic-alkyl methacrylate polymer, and a second graft shell made of an alkyl(meth)acrylate polymer. Said molding compositions feature good impact resistance, high flowability, high light transmittance, very low haze, and very little yellow tinge at their edges.

It is known that the mechanical properties of thermoplastic molding compositions can be improved by using elastomeric graft copolymers in which the graft core is composed of comparatively large agglomerated particles which are obtainable by adding an agglomeration polymer during production of the graft cores. Molding compositions of this type based on a very wide variety of plastics matrices are described by way of example in WO 01/83574 and WO 02/10222, as also are processes for producing the same. However, thermoplastic molding compositions of this type comprising graft cores made of comparatively large agglomerated particles usually have impaired optical properties.

WO 2005/075560 and WO 2007/036495 disclose thermoplastic molding compositions based on hard methyl methacrylate polymers, on hard vinylaromatic-vinyl cyanide polymers, and on soft graft copolymers, the mechanical and/or optical properties of which have been further improved. Said graft copolymers comprise a core and a first and a second graft shell, and in the case of WO 2005/075560 the core is characterized by a specific particle size distribution and constitution; factors described as important in WO 2007/036495 include a specific particle size distribution of the core, and also a specific difference between the refractive indices of the graft copolymer and of the matrix.

WO 2005/059029 describes thermoplastic molding compositions based on hard methyl methacrylate polymers, on hard vinylaromatic-vinyl cyanide polymers, and on soft graft copolymers, where these have comparable mechanical, rheological, and optical properties but improved chemicals resistance, for example solvent resistance, or water absorption. Said graft copolymers comprise a core and a first and a second graft shell, where the first graft shell features relatively low vinylaromatic contact and relatively high content of $C_1$-$C_8$-alkyl esters of methacrylic acid.

However, impairment of optical properties often occurs in particular applications, particularly on exposure to moisture over a prolonged period, a particular example being an increase in haze and/or an increase in the level of visible defects known as "specks".

BRIEF SUMMARY OF THE INVENTION

It was therefore an object of the present invention to provide thermoplastic molding compositions which are based on hard methyl methacrylate polymers, on hard vinylaromatic-vinyl cyanide polymers, and on soft graft copolymers, and which have not only good mechanical properties but also improved long-term stability of optical properties, particularly when exposed to moisture, particular examples being less increase in haze and/or less increase in the level of visible defects. Another object was to provide thermoplastic molding compositions of this type where the process conditions during production of moldings, for example the injection-molding temperature during the production of injection moldings, have minimum effect on the mechanical and/or optical properties of the molding compositions.

The thermoplastic molding compositions defined in the introduction have accordingly been found, and it is essential to the invention here that component (C32) is a vinylaromatic monomer and
the graft copolymer (C) is produced via emulsion polymerization and is isolated from the reaction mixture by precipitation resulting from shear.

Other discoveries include processes for producing these materials, the use thereof for producing moldings, and also moldings comprising the thermoplastic molding compositions of the invention.

The thermoplastic molding compositions of the invention, based on hard methyl methacrylate polymers, on hard vinylaromatic-vinyl cyanide polymers, and on soft graft copolymers, not only have good mechanical properties but also have improved long-term stability of optical properties, particularly when exposed to moisture, particular examples being less increase in haze and/or less increase in the level of visible defects.

Particularly when allyl methacrylate is used as component (C23), the invention gives thermoplastic molding compositions where the process conditions during production of moldings, for example the injection-molding temperature during the production of injection moldings, have minimum effect on the mechanical and/or optical properties of the compositions.

The thermoplastic molding compositions, processes, uses, and moldings of the invention are described below.

The thermoplastic molding compositions of the invention comprise a mixture of (a) from 10 to 50% by weight, preferably from 20 to 40% by weight, based on the entirety of components (A), (B), and (C), of a methyl methacrylate polymer as component (A), obtainable via polymerization of a mixture composed of
  (a1) from 90 to 100% by weight, preferably from 92 to 98% by weight, based on (A), of methyl methacrylate as component (A1), and
  (a2) from 0 to 10% by weight, preferably from 2 to 8% by weight, based on (A), of a $C_1$-$C_8$-alkyl ester of acrylic acid as component (A2), and
(b) from 20 to 60% by weight, preferably from 25 to 50% by weight, based on the entirety of components (A), (B), and (C), of a copolymer as component (B), obtainable via polymerization of a mixture composed of
  (b1) from 70 to 90% by weight, preferably from 75 to 85% by weight, based on (B), of a vinylaromatic monomer as component (B1), and
  (b2) from 10 to 30% by weight, preferably from 15 to 25% by weight, based on (B), of a vinyl cyanide as component (B2), and
(c) from 20 to 70% by weight, preferably from 25 to 55% by weight, based on the entirety of components (A), (B), and (C), of a graft copolymer as component (C), produced via emulsion polymerization and isolated from the reaction mixture by precipitation resulting from shear, and obtainable from
  (c1) from 50 to 70% by weight, preferably from 55 to 64% by weight, based on (C), of a core as component (C1), obtainable via polymerization of a monomer mixture composed of
    (c11) from 65 to 89.9% by weight, preferably from 69 to 84% by weight, based on (C1) of a 1,3-diene as component (C11), and
    (c12) from 10 to 34.9% by weight, preferably from 15 to 30% by weight, based on (C1), of a vinylaromatic monomer as component (C12), and
    (c13) from 0.1 to 5% by weight, preferably from 0.5 to 4% by weight, based on (C1), of an agglomeration polymer as component (C13), and
  (c2) from 15 to 25% by weight, preferably from 18 to 22% by weight, based on (C), of a first graft shell as component (C2), obtainable via polymerization of a monomer mixture, composed of
    (c21) from 30 to 49.9% by weight, preferably from 33 to 44.5% by weight, based on (C2), of a vinylaromatic monomer as component (C21), and
    (c22) from 50 to 69.9% by weight, preferably from 55 to 66.5% by weight, based on (C2), of a $C_1$-$C_8$-alkyl ester of methacrylic acid and/or of a $C_1$-$C_8$-alkyl ester of acrylic acid as component (C22), and
    (c23) from 0.1 to 3% by weight, preferably from 0.5 to 2% by weight, based on (C2), of a crosslinking monomer as component (C23), and
  (c3) from 15 to 25% by weight, preferably from 18 to 22% by weight, based on (C), of a second graft shell as component (C3), obtainable via polymerization of a monomer mixture composed of
    (c31) from 20 to 80% by weight, preferably from 35 to 65% by weight, based on (C3), of a $C_1$-$C_8$-alkyl ester of methacrylic acid as component (C31) and
    (c32) from 20 to 80% by weight, preferably from 35 to 65% by weight, based on (C3), of a vinylaromatic monomer as component (C32), and
(d) optionally, amounts of up to 20% by weight, preferably from 0 to 15% by weight, based on the entirety of components (A), (B), and (C), of conventional additives as component (D).

DETAILED DESCRIPTION OF THE INVENTION

The methyl methacrylate polymers (component (A)) used in the thermoplastic molding compositions of the invention are either homopolymers of methyl methacrylate (MMA) or copolymers of MMA with up to 10% by weight, based on (A) of a $C_1$-$C_8$-alkyl ester of acrylic acid.

The $C_1$-$C_8$-alkyl ester of acrylic acid (component (A2)) used can comprise methyl acrylate, ethyl acrylate, propyl acrylate, n-butyl acrylate, n-pentyl acrylate, n-hexyl acrylate, n-heptyl acrylate, n-octyl acrylate, or 2-ethylhexyl acrylate, or else a mixture thereof, preferably methyl acrylate, ethyl acrylate, n-butyl acrylate, 2-ethylhexyl acrylate, or a mixture thereof, particularly preferably methyl acrylate.

The methyl methacrylate (MMA) polymers can be produced via bulk polymerization, solution polymerization, or by suspension polymerization, by known methods (see by way of example Kunststoff-Handbuch [Plastics handbook], volume IX, "Polymethacrylate" [Polymethacrylate], Vieweg/Esser, Carl-Hanser-Verlag 1975), and they are available commercially. It is preferable to use methyl methacrylate polymers with weight-average molar mass values $M_w$ in the range from 60 000 to 300 000 g/mol (determined by light scattering in chloroform).

Component (B) is a copolymer of a vinylaromatic monomer (component (B1)) and vinyl cyanide (component (B2)).

Vinylaromatic monomers (component B1) that can be used are styrene, styrene substituted by from one to three $C_1$-$C_8$-alkyl radicals, for example p-methylstyrene or tert-butylstyrene, and also α-methylstyrene, preference being given to styrene, α-methylstyrene, or a mixture of said monomers, and particular preference being given to styrene.

The vinyl cyanide (component B2) used can be acrylonitrile and/or methacrylonitrile, preferably acrylonitrile.

Outside of the ranges stated above for the constitution of component (B), the molding compositions obtained usually exhibit haze at processing temperatures above 240° C.

The copolymers (B) can be produced by known processes, for example by bulk polymerization, solution polymerization, suspension polymerization, or emulsion polymerization, preferably by solution polymerization (see GB-A 14 72 195). Preference is given here to copolymers (B) with molar masses $M_w$ of from 60 000 to 300 000 g/mol, determined by light scattering in dimethylformamide.

The mixture of components (A) and (B) which forms the hard matrix of the thermoplastic molding compositions can by way of example take the form of a physical mixture of the individual components (A) and (B), known as a blend. However, the mixture of components (A) and (B) in the thermoplastic monomer compositions can also be used in the form of a copolymer (AB), where the copolymer (AB) comprises all of the components (A1), (B1), (B2) and, optionally, (A2) in the form of monomer units. However, it is also possible, of course, to use a mixture comprising components (A), (B), and copolymers (AB).

In this embodiment of the invention, where the mixture of components (A) and (B) is used in the form of a copolymer (AB), the thermoplastic molding composition comprises
(ab) from 30 to 80% by weight, preferably from 45 to 75% by weight, based on the entirety of components (AB) and (C), of a copolymer as component (AB), obtainable via polymerization of a mixture composed of
  (ab1) from 30 to 50% by weight, preferably from 35 to 45% by weight, based on (AB), of component (A1), and
  (ab2) from 0 to 10% by weight, preferably from 0 to 5% by weight, based on (AB), of component (A2), and
  (ab3) from 40 to 65% by weight, preferably from 45 to 55% by weight, based on (AB), of component (B1), and
  (ab4) from 5 to 20% by weight, preferably from 7 to 14% by weight, based on (AB), of component (B2), and
(c) from 20 to 70% by weight, preferably from 25 to 55% by weight, based on the entirety of components (AB) and (C), of component (C), and
(d) optionally, amounts of up to 20% by weight, preferably from 0 to 15% by weight, based on the entirety of components (AB) and (C), of component (D).

Processes for producing component (AB) are known to the person skilled in the art and are described in the literature, for example in EP 1 548 061 A1.

A graft copolymer is used as component (C), made of a core (C1) and of two graft shells (C2) and (C3) applied thereto.

The core (C1) is the graft base with a swelling index SI of from 15 to 60, in particular from 20 to 50, determined by measurement of swelling toluene at room temperature.

The 1,3-diene (component (C11)) used for the core of the graft copolymer (component C1) can be butadiene and/or isoprene, preferably 1,3-butadiene.

The vinylaromatic monomers (component (C12)) that can be used are styrene, styrene substituted by from one to three $C_1$-$C_8$-alkyl radicals, for example p-methylstyrene or tert-butylstyrene, and also α-methylstyrene, preference being given to styrene, α-methylstyrene, or a mixture of said monomers, and particular preference being given to styrene.

The agglomeration polymer (component (C13)) used can be substances known to the person skilled in the art and described by way of example in WO 01/83574, WO 02/10222, or DE-A 24 27 960. Examples of suitable agglomeration polymers are acrylic ester polymers, preferably copolymers of ethyl acrylate and methacrylamide, in which the proportion of ethyl acrylate is from 80 to 99.9% by weight and the proportion of methacrylamide is from 0.1 to 20% by weight (where these % by weight values are in each case based on the total weight of the copolymer) and where said acrylic ester polymers are preferably used in the form of an aqueous dispersion; the concentration of the acrylic ester polymers in this type of dispersion is preferably from 3 to 40% by weight, with particular preference from 5 to 20% by weight, based on the total weight of the dispersion.

The core (C1) is produced in two stages by processes known to the person skilled in the art and described by way of example in WO 01/83574. In the usual method, components (C11) and (C12) are used in the first stage in emulsion polymerization processes known to the person skilled in the art (see by way of example Encyclopedia of Polymer Science and Engineering, volume 1, pp. 401ff) to produce a core, the glass transition temperature of which is preferably below 0° C., and the average particle size $D_{50}$ of which is generally in the range from 30 to 240 nm, preferably in the range from 50 to 180 nm (determined by the method described below). In a second stage, the process known to the person skilled in the art and described by way of example in WO 01/83574 is used for the reaction of the core obtained in the first stage with the agglomeration polymer (C13), thus obtaining the core (C1), which generally comprises not only agglomerated cores with correspondingly relatively large particle sizes but also residual non-agglomerated cores having the abovementioned particle sizes. In preferred embodiments, the core (C1) has the bimodal or polymodal particle size distribution described by way of example in WO 01/83574, particular preference being given to bimodal particle size distribution. Irrespective of the nature of the particle size distribution, the core (C1) generally has an average particle size $D_{50}$, averaged over all of the particles, in the range from 100 nm to 600 nm (determined by the method described below).

The graft shell (C2) is applied to the core (C1) and comprises the monomers (C21), (C22), and (C23).

Vinylaromatic monomers (component C21) that can be used are styrene, styrene substituted by from one to three $C_1$-$C_8$-alkyl radicals, for example p-methylstyrene or tert-butylstyrene, and also α-methylstyrene, preference being given to styrene, α-methylstyrene, or a mixture of said monomers, and particular preference being given to styrene.

Component (C22) used can be $C_1$-$C_8$-alkyl esters of methacrylic acid, $C_1$-$C_8$-alkyl esters of acrylic acid, or a mixture thereof. Suitable $C_1$-$C_8$-alkyl esters of methacrylic acid are methyl methacrylate (MMA), ethyl methacrylate, n-, isopropyl methacrylate, n-butyl methacrylate, isobutyl methacrylate, sec-butyl methacrylate, tert-butyl methacrylate, pentyl methacrylate, hexyl methacrylate, heptyl methacrylate, octyl methylacrylate, or 2-ethylhexyl methacrylate, particular preference being given to methyl methacrylate, or else can be a mixture of said monomers. Suitable $C_1$-$C_8$-alkyl esters of acrylic acid are the monomers described above as component (A2). A mixture of from 80 to 98% by weight of methyl methacrylate and from 2 to 20% by weight of n-butyl acrylate, based in each case on the total weight of component (C22), can be used with preference as component (C22).

Monomers that can be used for component (C23) are conventional crosslinking monomers, i.e. in essence di- or polyfunctional comonomers, in particular alkylene glycol di(meth)acrylates, such as ethylene, propylene, and butylene glycol di(meth)acrylate, allyl methacrylate, (meth)acrylates of glycerol, and trimethylolpropane, and pentaerythritol, and it is also possible to use vinylbenzenes, such as di- or trivinylbenzene, or dihydrodicyclopentadienyl acrylate in the form of an isomer mixture. Allyl methacrylate is particularly preferably used as component (C23) since this embodiment of the invention gives thermoplastic molding compositions where the process conditions during production of moldings, in particular the injection-molding temperature during production of injection moldings, have little or no effect on the mechanical and/or optical properties of the compositions.

A further graft shell (C3) is in turn applied to the graft shell (C2), and comprises the monomers (C31) and (C32). The monomers (C31) are $C_1$-$C_8$-alkyl esters of methacrylic acid, and the monomers (C32) in the invention are one or more vinylaromatic monomers.

The $C_1$-$C_8$-alkyl esters of methacrylic acid (monomers C31) used can be methyl methacrylate (MMA), ethyl methacrylate, n-, isopropyl methacrylate, n-butyl methacrylate, isobutyl methacrylate, sec-butyl methacrylate, tert-butyl methacrylate, pentyl methacrylate, hexyl methacrylate, heptyl methacrylate, octyl methylacrylate, or 2-ethylhexyl methacrylate, particular preference being given to methyl methacrylate, or else can be a mixture of said monomers.

Vinylaromatic monomers (component (C32)) that can be used according to the invention are styrene, styrene substituted by from one to three $C_1$-$C_8$-alkyl radicals, for example p-methylstyrene or tert-butylstyrene, and also α-methylstyrene, preference being given to styrene, α-methylstyrene, or a mixture of said monomers, and particular preference being given to styrene.

The two graft shells (C2) and (C3) are produced in the presence of the core (C1) by methods known from the literature, in particular via emulsion polymerization (Encyclopedia of Polymer Science and Engineering, volume 1, pp. 401ff). The "seed" procedure used in that publication avoids formation of any new particles during production of the two graft shells. The emulsion polymerization process is usually initiated by polymerization initiators.

The emulsion polymerization process can use ionic or nonionic emulsifiers.

Examples of suitable emulsifiers are dioctyl sodium sulfosuccinate, sodium lauryl sulfate, sodium dodecylbenzenesulfonate, alkylphenoxypolyethylenesulfonates, and salts of long-chain carboxylic and sulfonic acids.

Examples of suitable nonionic emulsifiers are fatty alcohol polyglycol ethers, alkylaryl polyglycol ethers, fatty acid monoethanolamides, and also ethoxylated fatty acid amides and ethoxylated fatty amines.

The total amount of emulsifier is preferably from 0.05 to 5% by weight, based on the total weight of the emulsion graft copolymer.

Polymerization initiators that can be used are ammonium and alkali metal peroxodisulfates, such as potassium peroxodisulfate, and also combined initiator systems, such as sodium persulfate, sodium hydrosulfite, potassium persulfate, sodium formaldehyde-sulfoxylate, and potassium peroxodisulfate, sodium dithionite-iron(II) sulfate, where the polymerization temperatures are from 50 to 100° C. in the case of the ammonium and alkali metal peroxodisulfates, which require thermal activation, and are lower, approximately within the range from 20 to 50° C. in the case of the combined initiators acting as redox systems.

The total amount of initiator is preferably from 0.02 to 1.0% by weight, based on the finished emulsion polymer.

Polymerization regulators can moreover be used not only during production of the graft base, i.e. of the core (C1), but also during production of the two grafts, i.e. the two graft shells (C2) and (C3). Examples of polymerization regulators used are alkyl mercaptans, such as n- or tert-dodecyl mercaptan. The usual amount used of the polymerization regulators, based on the respective stage, is from 0.01 to 2.0% by weight.

In other respects, the method of production of the emulsion graft copolymer to be used in the invention is that an aqueous mixture composed of monomers, crosslinking agent, emulsifier, initiator, regulator, and a buffer system is used as initial charge in a nitrogen-inertized reactor, and is inertized at low temperature, with stirring, and is then brought to the polymerization temperature over the course of from 15 to 120 minutes. The mixture is then polymerized until conversion is at least 95%. Monomers, crosslinking agent, emulsifier, initiator, and regulator can also be entirely or to some extent introduced in the form of a feed into the aqueous initial charge.

Stages (C2) and (C3) are generated optionally after a continued reaction time of from 15 to 600 minutes with feed of the monomers in the presence of the previously formed stage (C1), via emulsion polymerization.

In the invention, the graft copolymer (C) produced via emulsion polymerization is isolated from the resultant reaction mixture (often termed "latex") by precipitation resulting from shear, using processes known per se, generally with subsequent filtration and drying. The precipitation process resulting from shear, i.e. the coagulation and precipitation of the graft copolymer from the reaction mixture as a result of exposure to mechanical shear forces, is known to the person skilled in the art and described in the literature, for example in WO 98/28344, WO 00/32376, WO 2006/087279. In principle, the graft copolymer (C) produced via emulsion polymerization can also be isolated from the resultant reaction mixture by spray drying, using processes known per se, but spray drying is mostly more expensive than the precipitation process resulting from shear.

The method of drying can by way of example be freeze drying, spray drying, fluidized-bed drying, or drying by circulation of air.

The emulsion graft copolymer precipitated can also be further processed without drying.

The swelling index SI of the graft copolymer (C) is preferably from 10 to 40, in particular from 12 to 35. The swelling index is determined here by measurement of swelling in toluene at room temperature.

The particle size distribution of the graft copolymer (C) is preferably bimodal, where the first maximum of the particle size distribution is in the range from 80 to 200 nm, preferably in the range from 100 to 160 nm, and the second maximum of the particle size distribution is in the range from 250 to 500 nm, preferably in the range from 300 to 450 nm (determined in each case by the method described below).

Another feature of the thermoplastic molding composition of the invention is preferably that the ratio by weight of the first graft shell (C2) to the second graft shell (C3) is in the range from 1.5:1 to 1:1.5.

Usual additives (D) that can be used are any substances which have good solubility in components (A), (B), and (C) or, respectively, (AB) and (C), or have good miscibility with these. Suitable additives are inter alia dyes and color pigments, stabilizers, lubricants, flame retardants, and antistatic agents.

The molding compositions of the invention are produced from components (A), (B), (C), and, if desired, (D), or, respectively, (AB), (C), and, if desired, (D) by processes known to the person skilled in the art, in particular by mixing all of the components in the melt, using apparatuses known to the person skilled in the art, at temperatures in the range from 200 to 300° C., in particular from 200 to 280° C.

Preferred processes for producing the thermoplastic molding compositions of the invention are those in which the following are mixed in the melt:
- (a) from 10 to 50% by weight, preferably from 20 to 40% by weight, based on the entirety of components (A), (B), and (C), of a methyl methacrylate polymer as component (A), obtainable via polymerization of a mixture composed of
  - (a1) from 90 to 100% by weight, preferably from 92 to 98% by weight, based on (A), of methyl methacrylate as component (A1), and
  - (a2) from 0 to 10% by weight, preferably from 2 to 8% by weight, based on (A), of a $C_1$-$C_8$-alkyl ester of acrylic acid as component (A2), and
- (b) from 20 to 60% by weight, preferably from 25 to 50% by weight, based on the entirety of components (A), (B), and (C), of a copolymer as component (B), obtainable via polymerization of a mixture composed of
  - (b1) from 70 to 90% by weight, preferably from 75 to 85% by weight, based on (B), of a vinylaromatic monomer as component (B1), and
  - (b2) from 10 to 30% by weight, preferably from 15 to 25% by weight, based on (B), of a vinyl cyanide as component (B2), and
- (c) from 20 to 70% by weight, preferably from 25 to 55% by weight, based on the entirety of components (A), (B), and (C), of a graft copolymer as component (C), obtainable from
  - (c1) from 50 to 70% by weight, preferably from 55 to 64% by weight, based on (C), of a core as component (C1), obtainable via polymerization of a monomer mixture composed of
    - (c11) from 65 to 89.9% by weight, preferably from 69 to 84% by weight, based on (C1) of a 1,3-diene as component (C11), and
    - (c12) from 10 to 34.9% by weight, preferably from 15 to 30% by weight, based on (C1), of a vinylaromatic monomer as component (C12), and
    - (c13) from 0.1 to 5% by weight, preferably from 0.5 to 4% by weight, based on (C1), of an agglomeration polymer as component (C13), and
  - (c2) from 15 to 25% by weight, preferably from 18 to 22% by weight, based on (C), of a first graft shell as component (C2), obtainable via polymerization of a monomer mixture, composed of
    - (c21) from 30 to 49.9% by weight, preferably from 33 to 44.5% by weight, based on (C2), of a vinylaromatic monomer as component (C21), and
    - (c22) from 50 to 69.9% by weight, preferably from 55 to 66.5% by weight, based on (C2), of a $C_1$-$C_8$-alkyl ester of methacrylic acid and/or of a $C_1$-$C_8$-alkyl ester of acrylic acid as component (C22), and
    - (c23) from 0.1 to 3% by weight, preferably from 0.5 to 2% by weight, based on (C2), of a crosslinking monomer as component (C23), and
  - (c3) from 15 to 25% by weight, preferably from 18 to 22% by weight, based on (C), of a second graft shell as component (C3), obtainable via polymerization of a monomer mixture composed of
    - (c31) from 20 to 80% by weight, preferably from 35 to 65% by weight, based on (C3), of a $C_1$-$C_8$-alkyl ester of methacrylic acid as component (C31) and
    - (c32) from 20 to 80% by weight, preferably from 35 to 65% by weight, based on (C3), of a vinylaromatic monomer as component (C32), and
- (d) optionally, amounts of up to 20% by weight, preferably from 0 to 15% by weight, based on the entirety of components (A), (B), and (C), of conventional additives as component (D), where it is essential to the invention that
a vinylaromatic monomer is used as component (C32) and the graft copolymer (C) is produced via emulsion polymerization and is isolated from the reaction mixture by precipitation resulting from shear.

Other preferred processes for producing the thermoplastic molding compositions of the invention are those in which the following are mixed in the melt:
- (ab) from 30 to 80% by weight, preferably from 45 to 75% by weight, based on the entirety of components (AB) and (C), of a copolymer as component (AB), obtainable via polymerization of a mixture composed of
  - (ab1) from 30 to 50% by weight, preferably from 35 to 45% by weight, based on (AB), of component (A1), and
  - (ab2) from 0 to 10% by weight, preferably from 0 to 5% by weight, based on (AB), of component (A2), and
  - (ab3) from 40 to 65% by weight, preferably from 45 to 55% by weight, based on (AB), of component (B1), and
  - (ab4) from 5 to 20% by weight, preferably from 7 to 14% by weight, based on (AB), of component (B2), and
- (c) from 20 to 70% by weight, preferably from 25 to 55% by weight, based on the entirety of components (AB) and (C), of a graft copolymer as component (C), obtainable from
  - (c1) from 50 to 70% by weight, preferably from 55 to 64% by weight, based on (C), of a core as component (C1), obtainable via polymerization of a monomer mixture composed of
    - (c11) from 65 to 89.9% by weight, preferably from 69 to 84% by weight, based on (C1) of a 1,3-diene as component (C11), and
    - (c12) from 10 to 34.9% by weight, preferably from 15 to 30% by weight, based on (C1), of a vinylaromatic monomer as component (C12), and
    - (c13) from 0.1 to 5% by weight, preferably from 0.5 to 4% by weight, based on (C1), of an agglomeration polymer as component (C13), and
  - (c2) from 15 to 25% by weight, preferably from 18 to 22% by weight, based on (C), of a first graft shell as component (C2), obtainable via polymerization of a monomer mixture, composed of
    - (c21) from 30 to 49.9% by weight, preferably from 33 to 44.5% by weight, based on (C2), of a vinylaromatic monomer as component (C21), and
    - (c22) from 50 to 69.9% by weight, preferably from 55 to 66.5% by weight, based on (C2), of a $C_1$-$C_8$-alkyl ester of methacrylic acid and/or of a $C_1$-$C_8$-alkyl ester of acrylic acid as component (C22), and
    - (c23) from 0.1 to 3% by weight, preferably from 0.5 to 2% by weight, based on (C2), of a crosslinking monomer as component (C23), and
  - (c3) from 15 to 25% by weight, preferably from 18 to 22% by weight, based on (C), of a second graft shell as component (C3), obtainable via polymerization of a monomer mixture composed of
    - (c31) from 20 to 80% by weight, preferably from 35 to 65% by weight, based on (C3), of a $C_1$-$C_8$-alkyl ester of methacrylic acid as component (C31) and
    - (c32) from 20 to 80% by weight, preferably from 35 to 65% by weight, based on (C3), of another monomer as component (C32), and (d) optionally, amounts of up to 20% by weight, preferably from 0 to 15% by weight, based on the entirety of components (AB) and (C), of conventional additives as component (D), where it is essential to the invention that
a vinylaromatic monomer is used as component (C32) and
the graft copolymer (C) is produced via emulsion polymerization and is isolated from the reaction mixture by precipitation resulting from shear.

In one preferred embodiment, a feature of the thermoplastic molding compositions of the invention is that the refractive index ($n_D$-$C_2$) of the first graft shell (C2) is smaller than the refractive index ($n_D$-$C_3$) of the second graft shell (C3). It is preferable that the refractive index ($n_D$-$C_2$) of the first graft shell (C2) is smaller by at least 2%, in particular by at least 3%, than the refractive index ($n_D$-$C_3$) of the second graft shell (C3).

In another preferred embodiment, the thermoplastic molding compositions of the invention are characterized in that the difference between refractive index ($n_D$-C) of the entire component (C) and the refractive index ($n_D$-AB) of the entire matrix of components (A) and (B) or, respectively, (AB) is smaller than or equal to 0.02, in particular smaller than or equal to 0.015.

In another preferred embodiment, the molding compositions of the invention are further characterized in that the difference between the refractive index ($n_D$-$C_2C_3$) of the entire graft shell of the graft copolymer C and the refractive index ($n_D$-$C_1$) of the core (C1) is smaller than 0.06, in particular smaller than 0.01, very particularly preferably being 0.00. The molding compositions according to this embodiment feature particularly low haze.

Each of the refractive indices mentioned is to be determined by the methods mentioned below (see examples).

The thermoplastic molding compositions of the invention can in particular be used to produce moldings via injection molding or via blow molding. However, the thermoplastic molding compositions can also be pressed, calendered, extruded, or vacuum-formed.

The thermoplastic molding compositions of the invention based on hard methyl methacrylate polymers, on hard vinylaromatic and vinyl cyanide polymers, and on soft graft copolymers have not only good mechanical properties but also improved long-term stability optical properties, in particular when exposed to moisture, particular examples being reduced increase in haze and/or a reduced increase in the level of visual defects.

In particular when allyl methacrylate is used as component (C23), the invention gives thermoplastic molding compositions where the process conditions during production of moldings, for example the injection-molding temperature during production of injection moldings, have minimum effect on the mechanical and/or optical properties of the compositions.

EXAMPLES

In each of the inventive examples and comparative examples below, a thermoplastic molding composition was produced and the following properties were determined:

Refractive Index $n_D$ [Dimensionless]:

The refractive indices ($n_D$-$C_1$), ($n_D$-C), and ($n_D$-AB) were measured on foils which were produced from the respective polymer cores (C1), polymers (C), or polymer mixtures composed of components (A) and (B) or, respectively, (AB) by first pressing the material in an IWK press at 200° C. for 2 minutes at a pressure of from 3 to 5 bar and finally further pressing the material at 200° C. for 3 minutes at 200 bar. The measurements were made at 20° C. using an Abbé refractometer by the method for measuring refractive indices of solid bodies (see Ullmanns Encyklopädie der technischen Chemie [Ullmann's Encyclopedia of Industrial Chemistry], volume 2/1, p. 486, Herausgeber E. Foerst; Urban & Schwarzenberg, Munich-Berlin 1961).

Refractive index ($n_D$-$C_2$) was calculated incrementally from the following formula:

$$(n_D - C_2) = \sum_{i=1}^{n} [x_i^{C2} * (nD - M_i^{C2})] \bigg/ \sum_{i=1}^{n} [x_i^{C2}]$$

where $x_i^{C2}$ is the parts by weight of monomer component $M_i^{C2}$ of which the graft shell (C2) is composed, ($nD$-$M_i^{C2}$) is the refractive index increment of monomer component $M_i^{C2}$ of which the graft shell (C2) is composed, and n is the number of different monomer components of which the graft shell (C2) is composed.

Refractive index ($n_D$-$C_3$) was calculated incrementally from the following formula:

$$(n_D - C_3) = \sum_{i=1}^{n} [x_i^{C3} * (nD - M_i^{C3})] \bigg/ \sum_{i=1}^{n} [x_i^{C3}]$$

where $x_i^{C3}$ is the parts by weight of monomer component $M_i^{C3}$ of which the graft shell (C3) is composed, ($nD$-$M_i^{C3}$) is the refractive index increment of monomer component $M_i^{C3}$ of which the graft shell (C3) is composed, and n is the number of different monomer components of which the graft shell (C3) is composed.

The values used as refractive index increments ($nD$-$M_i^{C2}$) and, respectively, ($nD$-$M_i^{C3}$) of monomer components $M_i^{C2}$ and, respectively, $M_i^{C3}$ of which the graft shells (C2) and, respectively, (C3) are composed were as follows:

| | |
|---|---|
| styrene: | 1.592 |
| methyl methacrylate: | 1.492 |
| butyl acrylate: | 1.466 |
| dihydrodicyclopentadienyl acrylate: | 1.539 |
| allyl methacrylate: | 1.510 |

The refractive index ($n_D$-$C_2C_3$) of the entire graft shell was calculated from the following formula:

$$(n_D\text{-}C_2C_3) = [y^{C2}*(n_D\text{-}C_2) + y^{C3}*(n_D\text{-}C_3)]/[y^{C2}+y^{C3}]$$

where $y^{C2}$ and, respectively, $y^{C3}$ are the respective parts by weight of the first graft shell (C2) and, respectively, second graft shell (C3) of which the entire graft shell is composed, and the refractive indices ($n_D$-$C_2$) and ($n_D$-$C_3$) were determined as described above.

Swelling Index SI [Dimensionless]:

The swelling index SI of the graft core polymer (C1) and of the graft copolymer (C) was measured on foils which were obtained by drying overnight at 50° C. and from 700 to 800 mbar of the dispersions produced in the production process described at a later stage below for the rubber cores (C1) and, respectively, the graft copolymers (C).

Toluene was added to a piece of the respective foils. The liquid was decanted after 24 hours, and the swollen foil was weighed. The swollen foil was dried in vacuo to constant weight at up to 120° C. and again weighed. The swelling index is calculated as the quotient derived from the weight of the swollen foil and the weight of the dried foil.

Notched Impact Resistance $a_k$ [kJ/m$^2$]:

Notched impact resistance $a_k$ was determined to ISO 179-2/1eA(F) at 23° C.

Transmittance [%]:

Transmittance was determined to DIN 53236 on plaques of thickness 2 mm.

Haze [%]:

The haze value to ASTM D1003, measured on test specimens of thickness 2 mm, was used as a measure of light scattering.

Particle Size Distribution and Average Particle Size $D_{50}$ [nm]:

Average particle size $D_{50}$ (weight average), particle size maxima and the particle size distribution of the cores (C1) and of the graft copolymer (C) were determined by means of hydrodynamic chromatography ("HDC"). "Particle Size Distribution Analyzer (PSDA)" equipment from Polymer Labs was used here. The respective lattices here were passed together with an eluent through a column packed with a non-porous material. The eluent comprised salt and nonionic and anionic surfactants. Elution time was calibrated by using PS calibration lattices. Measurements covered the range from 15 nm to 1200 nm (larger particles being removed by filtration and not detected), with weighting in accordance with UV absorption at 254 nm.

Visually Discernible Defects:

Test specimens were produced from the molding compositions and stored for 16 h at 20° C. and, respectively, 6 h at 70° C. in water. The number of defects per cm$^2$ of the test specimens was then assessed visually and allocated to one of the following categories: "very good" (++), "good" (+), "adequate" (o), "poor" (–) or "very poor" (– –).

Production of Molding Compositions:

A copolymer made of 95.5% by weight of methyl methacrylate and 4.5% by weight of methyl acrylate with intrinsic viscosity IV 66 ml/g (determined on a 0.5% strength by weight solution in dimethylformamide at 23° C. to DIN 53727) was used as component A.

A copolymer made of 81% by weight of styrene and 19% by weight of acrylonitrile with intrinsic viscosity IV 62 ml/g (determined on a 0.5% strength by weight solution in dimethylformamide at 23° C. to DIN 53727) was used as component B.

Components C were Produced as Follows:

The first stage produced graft bases for the graft cores C1 by respectively first using nitrogen to inertize a solution made of 188 parts by weight of water, 0.36 part by weight of sodium bicarbonate, 0.30 part by weight of sodium peroxodisulfate, and 0.55 part by weight of potassium stearate and controlling the temperature of the same to 75° C. A mixture made of 1 part by weight of tert-dodecyl mercaptan, 73 parts by weight of butadiene, and 27 parts by weight of styrene was then added, with stirring. The mixture was polymerized until conversion was at least 95%.

The resultant graft bases for the graft cores C1 had an average particle diameter $D_{50}$ of 127 nm, an average particle diameter $D_{90}$ of 148 nm, and a swelling index SI of 47.

| Bu | Butadiene | AMA | Allyl methacrylate |
|---|---|---|---|
| S | Styrene | DCPA | Dihydrocyclopentadienyl acrylate |
| MMA | Methyl methacrylate | BA | Butyl acrylate |
| Aggl | Agglomeration polymer (see WO 2008 020012, example 3.1a) | | |

The reaction mixture respectively comprising the parts by weight stated in Table 1 of graft cores C1 was used as initial charge and inertized with nitrogen. The respective parts by weight stated in Table 1 of the agglomeration polymer (calculated as solid) were then added in the form of a 10% strength by weight dispersion in water within a period of 15 min. After a further 15 minutes, 0.95 part by weight of potassium stearate and 0.05 part by weight of potassium peroxodisulfate in 10 parts by weight of water were respectively added. The following were respectively admixed with this mixture at 75° C. within a period of 1.5 h: the number of parts by weight given in Table 1 of a mixture of the monomers of which the first graft shell C2 is composed, where the latter mixture was respectively composed of the parts by weight specified in Table 1 of S, MMA, BA, and AMA and, respectively, DCPA. Once the feed had ended, the polymerization reaction for construction of the first graft shell C2 was continued for 15 min.

The following were respectively added within a period of 1.5 h to the resultant reaction mixtures: the number of parts by weight given in Table 1 of a mixture of the monomers of which the second graft shell C3 is composed, where the latter mixture was respectively composed of the parts by weight specified in Table 1 of MMA and S and, respectively—for comparison—MMA and BA. A further 0.2 part of weight of potassium peroxodisulfate in 10 parts by weight of water was respectively added, and further polymerization of the mixture was carried out for 1.5 h.

The resultant graft copolymers were then isolated either by shear precipitation or by salt precipitation (for comparison) and dried in vacuo to constant weight, after washing with water, at 60° C.

For the shear precipitation process, an apparatus was used which was composed of Ultra-Turrax T50 drive system with flanged-on DK 50 flow chamber from Ika. This was operated at 10 000 rpm. The reaction mixture C here is passed into the flow chamber from below. The paste is collected from the lateral aperture of the flow chamber, slurried using 50 parts of water per 50 parts of composition, and heated at 100° C. for 5 min. After cooling to 60° C., the solution is filtered and washed with 50 parts of water. The resultant component C is then dried in vacuo to constant weight at 60° C.

For the salt precipitation process, 50 parts of the reaction mixture C were added at 60° C. to 80 parts of an aqueous magnesium sulfate solution (1 part of magnesium sulfate for 100 parts of water). The mixture is then heated to 100° C. and kept at said temperature for 5 minutes. After cooling to 60° C., the solution is filtered and washed with 50 parts of water. The resultant component C is then dried in vacuo to constant weight at 60° C.

The molding compositions 1 of the invention and the comparative molding compositions comp 1-comp 3 were produced from the parts by weight given in Table 1 of components A, B, and C, in a melt at temperatures of 250° C. The mixing ratio here was selected in such a way that the weight-average refractive index of components A and B was the same as that of component C. Test specimens were produced from the molding compositions by injection molding, and unless otherwise stated the injection temperature was 250° C. In order to evaluate the effect of processing temperature, test specimens were also produced at a melt temperature of 230° C. and 270° C.

TABLE 1

| Molding composition | A | B | C | C1 | Composition C1 | C2 | Composition C2 | C3 | Composition C3 | Precipitation method |
|---|---|---|---|---|---|---|---|---|---|---|
| 1 | 25.6 | 34.4 | 40 | 60 | 71.5 B - 25.6 S - 0.9 TDMK - 2.0 Aggl | 20 | 42.8 S - 48.2 MMA - 8.0 BA - 1.0 AMA | 20 | 50.0 S - 50.0 MMA | Shear precipitation |
| comp 1 | 32.7 | 28.3 | 40 | 60 | 71.5 B - 25.6 S - 0.9 TDMK - 2.0 Aggl | 20 | 42.8 S - 48.2 MMA - 8.0 BA - 1.0 AMA | 20 | 85.0 MMA - 15.0 BA | Shear precipitation |
| comp 2 | 26.0 | 34.0 | 40 | 60 | 71.5 B - 25.6 S - 0.9 TDMK - 2.0 Aggl | 20 | 42.8 S - 48.2 MMA - 8.0 BA - 1.0 AMA | 20 | 50.0 S - 50.0 MMA | Salt precipitation |
| comp 3 | 33.5 | 26.5 | 40 | 60 | 71.5 B - 25.6 S - 0.9 TDMK - 2.0 Aggl | 20 | 42.8 S - 48.2 MMA - 8.0 BA - 1.0 AMA | 20 | 85.0 MMA - 15.0 BA | Salt precipitation |
| comp 4 | 27.0 | 33.0 | 40 | 60 | 71.1 B - 25.5 S - 0.9 TDMK - 2.5 Aggl | 20 | 36.8 S - 54.2 MMA - 8.0 BA - 1.0 AMA | 20 | 50.0 S - 50.0 MMA | Salt precipitation |

Table 2 collates the mechanical and optical properties of the resultant specimens.

TABLE 2

| Molding composition | ($n_D$-C) | ak (230° C.) | ak (250° C.) | ak (270° C.) | Haze | Visual defects |
|---|---|---|---|---|---|---|
| 1 | 1.5395 | | 18.6 | | 7.5 | ++ |
| comp 1 | 1.5335 | | 18.9 | | 17.9 | + |
| comp 2 | 1.5405 | 13.3 | 13.5 | 13.3 | 7.7 | – |
| comp 3 | 1.5310 | 10.1 | 11.2 | 13.6 | 24.8 | – – |
| comp 4 | 1.5400 | 15.4 | 15.4 | 14.9 | 3.9 | – |

The invention claimed is:

1. A thermoplastic molding composition comprising a mixture of
   (a) from 10 to 50% by weight, based on the entirety of components (A), (B), and (C), of a methyl methacrylate polymer as component (A), obtainable via polymerization of a mixture composed of
      (a1) from 90 to 100% by weight, based on (A), methyl methacrylate as component (A1), and
      (a2) from 0 to 10% by weight, based on (A), of a $C_1$-$C_8$-alkyl ester of acrylic acid as component (A2), and
   (b) from 20 to 60% by weight, based on the entirety of components (A), (B), and (C), of a copolymer as component (B), obtainable via polymerization of a mixture composed of
      (b1) from 70 to 90% by weight, based on (B), of a vinylaromatic monomer as component (B1), and
      (b2) from 10 to 30% by weight, based on (B) of a vinyl cyanide as component (B2), and
   (c) from 20 to 70% by weight, based on the entirety of components (A), (B), and (C), of a graft copolymer as component (C), obtainable from
      (c1) from 50 to 70% by weight, based on (C), of a core as component (C1), obtainable via polymerization of a monomer mixture composed of
         (c11) from 65 to 89.9% by weight, based on (C1) of a 1,3-diene as component (C11), and
         (c12) from 10 to 34.9% by weight, based on (C1), of a vinylaromatic monomer as component (C12), and
         (c13) from 0.1 to 5% by weight, based on (C1), of an agglomeration polymer as component (C13), and
      (c2) from 15 to 25% by weight, based on (C), of a first graft shell as component (C2), obtainable via polymerization of a monomer mixture composed of
         (c21) from 30 to 49.9% by weight, based on (C2), of a vinylaromatic monomer as component (C21), and
         (c22) from 50 to 69.9% by weight, based on (C2), of a $C_1$-$C_8$-alkyl ester of methacrylic acid and/or of a $C_1$-$C_8$-alkyl ester of acrylic acid as component (C22), and
         (c23) from 0.1 to 3% by weight, based on (C2), of a crosslinking monomer as component (C23), and
      (c3) from 15 to 25% by weight, based on (C), of a second graft shell as component (C3), obtainable via polymerization of a monomer mixture composed of
         (c31) from 20 to 80% by weight, based on (C3), of a $C_1$-$C_8$-alkyl ester of methacrylic acid as component (C31) and
         (c32) from 20 to 80% by weight, based on (C3), of a further monomer as component (C32), and
   (d) optionally, amounts of up to 20% by weight, based on the entirety of components (A), (B), and (C), of additives as component (D),
   wherein
   component (C32) is a vinylaromatic monomer and
   the graft copolymer (C) is produced via emulsion polymerization and is isolated from the reaction mixture by precipitation resulting from shear.

2. The thermoplastic molding composition according to claim 1, wherein the graft copolymer (C) has a particle size distribution that is bimodal, and the first maximum of the particle size distribution lies within the range from 80 to 200 nm, and the second maximum of the particle size distribution lies within the range from 250 to 500 nm.

3. The thermoplastic molding composition according to claim 1, wherein a mixture of from 2 to 20% by weight of n-butyl acrylate and from 80 to 98% by weight of methyl methacrylate, based in each case on the total weight of component (C22), is used as component (C22).

4. The thermoplastic molding composition according to claim 1, wherein allyl methacrylate is used as component (C23).

5. The thermoplastic molding composition according to claim 1, where styrene, α-methylstyrene, or a mixture of said monomers is used as components (B1), (C12), (C21), and/or (C32).

6. The thermoplastic molding composition according to claim 1, wherein copolymers of from 80 to 99.9% by weight of ethyl acrylate and from 0.1 to 20% by weight of methacrylamide, based in each case on the total weight of component (C13), are used as agglomeration polymer (C13).

7. A thermoplastic molding composition comprising a mixture of copolymer (AB) and (C), wherein the thermoplastic molding composition comprises
- (ab) from 30 to 80% by weight, based on the entirety of component (AB) and (C), of a copolymer as component (AB), obtainable via polymerization of a mixture composed of
  - (ab1) from 30 to 50% by weight, based on (AB), of methyl methacrylate as component (A1), and
  - (ab2) from 0 to 10% by weight, based on (AB), of a $C_1$-$C_8$-alkyl ester of acrylic acid as component (A2), and
  - (ab3) from 40 to 65% by weight, based on (AB), of a vinylaromatic monomer as component (B1), and
  - (ab4) from 5 to 20% by weight, based on (AB), of a vinyl cyanide as component (B2), and
- (c) from 20 to 70% by weight of a graft copolymer as component (C), based on the entirety of components (AB) and (C), wherein the graft copolymer as component (C) is obtainable from
  - (c1) from 50 to 70% by weight, based on (C), of a core as component (C1), obtainable via polymerization of a monomer mixture composed of
    - (c11) from 65 to 89.9% by weight, based on (C1) of a 1,3-diene as component (C11), and
    - (c12) from 10 to 34.9% by weight, based on (C1), of a vinylaromatic monomer as component (C12), and
    - (c13) from 0.1 to 5% by weight, based on (C1), of an agglomeration polymer as component (C13), and
  - (c2) from 15 to 25% by weight, based on (C), of a first graft shell as component (C2), obtainable via polymerization of a monomer mixture composed of
    - (c21) from 30 to 49.9% by weight, based on (C2), of a vinylaromatic monomer as component (C21), and
    - (c22) from 50 to 69.9% by weight, based on (C2), of a $C_1$-$C_8$-alkyl ester of methacrylic acid and/or of a $C_1$-$C_8$-alkyl ester of acrylic acid as component (C22), and
    - (c23) from 0.1 to 3% by weight, based on (C2), of a crosslinking monomer as component (C23), and
  - (c3) from 15 to 25% by weight, based on (C), of a second graft shell as component (C3), obtainable via polymerization of a monomer mixture composed of
    - (c31) from 20 to 80% by weight, based on (C3), of a $C_1$-$C_8$-alkyl ester of methacrylic acid as component (C31) and
    - (c32) from 20 to 80% by weight, based on (C3), of a further monomer as component (C32), and
- (d) optionally, amounts of up to 20% by weight, based on the entirety of components (AB) and (C), of component (D).

8. A process for producing a thermoplastic molding composition which comprises mixing the following in the melt: either
- (a) from 10 to 50% by weight, based on the entirety of components (A), (B), and (C), of a methyl methacrylate polymer as component (A), obtainable via polymerization of a mixture composed of
  - (a1) from 90 to 100% by weight, based on (A), methyl methacrylate as component (A1), and
  - (a2) from 0 to 10% by weight, based on (A), of a $C_1$-$C_8$-alkyl ester of acrylic acid as component (A2), and
- (b) from 20 to 60% by weight, based on the entirety of components (A), (B), and (C), of a copolymer as component (B), obtainable via polymerization of a mixture composed of
  - (b1) from 70 to 90% by weight, based on (B), of a vinylaromatic monomer as component (B1), and
  - (b2) from 10 to 30% by weight, based on (B) of a vinyl cyanide as component (B2), or
- (ab) from 30 to 80% by weight, based on the entirety of component (AB) and (C), of a copolymer as component (AB), obtainable via polymerization of a mixture composed of
  - (ab1) from 30 to 50% by weight, based on (AB), of component (A1), and
  - (ab2) from 0 to 10% by weight, based on (AB), of component (A2), and
  - (ab3) from 40 to 65% by weight, based on (AB), of component (B1), and
  - (ab4) from 5 to 20% by weight, based on (AB), of component (B2), and with
- (c) from 20 to 70% by weight, based on the entirety of component (A), (B), and (C) or, respectively, (AB) and (C), of a graft copolymer as component (C), obtainable from
  - (c1) from 50 to 70% by weight, based on (C), of a core as component (C1), obtainable via polymerization of a monomer mixture composed of
    - (c11) from 65 to 89.9% by weight, based on (C1) of a 1,3-diene as component (C11), and
    - (c12) from 10 to 34.9% by weight, based on (C1), of a vinylaromatic monomer as component (C12), and
    - (c13) from 0.1 to 5% by weight, based on (C1), of an agglomeration polymeras component (C13), and
  - (c2) from 15 to 25% by weight, based on (C), of a first graft shell as component (C2), obtainable via polymerization of a monomer mixture composed of
    - (c21) from 30 to 49.9% by weight, based on (C2), of a vinylaromatic monomer as component (C21), and
    - (c22) from 50 to 69.9% by weight, based on (C2), of a $C_1$-$C_8$-alkyl ester of methacrylic acid and/or of a $C_1$-$C_8$-alkyl ester of acrylic acid as component (C22), and
    - (c23) from 0.1 to 3% by weight, based on (C2), of a crosslinking monomer as component (C23), and
  - (c3) from 15 to 25% by weight, based on (C), of a second graft shell as component (C3), obtainable via polymerization of a monomer mixture composed of
    - (c31) from 20 to 80% by weight, based on (C3), of a $C_1$-$C_8$-alkyl ester of methacrylic acid as component (C31) and
    - (c32) from 20 to 80% by weight, based on (C3), of a further monomer as component (C32), and
- (d) optionally, amounts of up to 20% by weight, based on the entirety of components (A), (B), and (C), or, respectively, (AB) and (C), of conventional additives as component (D), which comprises
using a vinylaromatic monomer as component (C32) and
producing the graft copolymer (C) via emulsion polymerization and isolating it from the reaction mixture by precipitation resulting from shear.

9. A process for producing a molding which comprises injection molding or blow molding the thermoplastic molding compositions according to claim 1 to form the molding.

10. A molding comprising the thermoplastic molding composition according to claim 1.

* * * * *